(12) United States Patent
Matsunaga et al.

(10) Patent No.: US 12,383,823 B2
(45) Date of Patent: Aug. 12, 2025

(54) INFORMATION PROCESSING APPARATUS AND GAME VIDEO RECORDING METHOD

(71) Applicant: Sony Interactive Entertainment Inc., Tokyo (JP)

(72) Inventors: Kiyobumi Matsunaga, Tokyo (JP); Masaki Takase, Tokyo (JP); Masahiro Fujihara, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 338 days.

(21) Appl. No.: 18/005,076

(22) PCT Filed: Jul. 19, 2021

(86) PCT No.: PCT/JP2021/026979
§ 371 (c)(1),
(2) Date: Jan. 11, 2023

(87) PCT Pub. No.: WO2022/019271
PCT Pub. Date: Jan. 27, 2022

(65) Prior Publication Data
US 2023/0302353 A1    Sep. 28, 2023

(30) Foreign Application Priority Data

Jul. 22, 2020    (JP) ................................ 2020-125329

(51) Int. Cl.
*G06F 16/2457*    (2019.01)
*A63F 13/35*    (2014.01)
(Continued)

(52) U.S. Cl.
CPC .............. *A63F 13/35* (2014.09); *A63F 13/63* (2014.09); *A63F 13/86* (2014.09)

(58) Field of Classification Search
CPC ........ A63F 13/497; A63F 13/60; A63F 13/64; A63F 13/79; A63F 13/86;
(Continued)

(56) References Cited

U.S. PATENT DOCUMENTS 8,515,253 B2    8/2013    Cottrell
9,003,147 B2    4/2015    Sakai
(Continued)

FOREIGN PATENT DOCUMENTS

JP    2011072735 A    4/2011
JP    2011516103 A    5/2011
(Continued)

OTHER PUBLICATIONS

International Search Report for related PCT Application No. PCT/JP2021/026978, 4 pages, dated Oct. 12, 2021.
(Continued)

*Primary Examiner* — Lawrence S Galka
(74) *Attorney, Agent, or Firm* — Kilpatrick Townsend & Stockton LLP

(57) ABSTRACT

An image evaluating section calculates evaluation values of a plurality of game videos recorded in a recording apparatus. A data reduction processing section reduces, on the basis of each of the evaluation values of the plurality of game videos, a data amount of a game video recorded in the recording apparatus. In the recording apparatus, an upper limit capacity is set to a region in which the plurality of game videos are recorded. The data reduction processing section reduces the data amount of the already recorded game videos, when a new game video is recorded in the recording apparatus.

8 Claims, 11 Drawing Sheets

(51) Int. Cl.
*A63F 13/63* (2014.01)
*H04N 21/845* (2011.01)
*A63F 13/86* (2014.01)

(58) Field of Classification Search
CPC ........ A63F 2300/634; H04N 21/23106; H04N 21/234309; H04N 21/239; H04N 21/2407; H04N 21/254; H04N 21/2743; H04N 21/44204; H04N 21/44213; H04N 21/4722; H04N 21/4756; H04N 21/84; H04N 21/8405; H04N 21/845; G06F 3/0608; G06T 3/40; G11B 27/34
See application file for complete search history.

(56) References Cited

U.S. PATENT DOCUMENTS

| | | | |
|---|---|---|---|
| 9,776,085 | B2 | 10/2017 | Shiraiwa |
| 10,034,032 | B2 | 7/2018 | Kunigita |
| 10,071,315 | B2 | 9/2018 | Watari |
| 10,255,348 | B2 | 4/2019 | Sato |
| 10,335,679 | B2 | 7/2019 | Fukuda |
| 10,693,956 | B1 | 6/2020 | Green |
| 2009/0208181 | A1 | 8/2009 | Cottrell |
| 2010/0269144 | A1 | 10/2010 | Forsman |
| 2012/0005628 | A1 | 1/2012 | Isozu |
| 2013/0111512 | A1 | 5/2013 | Scellato |
| 2013/0159654 | A1 | 6/2013 | Sakai |
| 2014/0274297 | A1* | 9/2014 | Lewis ............... H04N 21/8549 463/20 |
| 2014/0364206 | A1 | 12/2014 | Shiraiwa |
| 2015/0018094 | A1 | 1/2015 | Watari |
| 2017/0105029 | A1 | 4/2017 | Kunigita |
| 2017/0154097 | A1 | 6/2017 | Sato |
| 2017/0182415 | A1 | 6/2017 | Fukuda |
| 2018/0253765 | A1 | 9/2018 | Avedissian |
| 2019/0351335 | A1 | 11/2019 | Yong |

FOREIGN PATENT DOCUMENTS

| | | |
|---|---|---|
| JP | 2013123537 A | 6/2013 |
| JP | 2015013102 A | 1/2015 |
| JP | 2015016104 B1 | 1/2015 |
| JP | 2015198404 A | 11/2015 |
| JP | 6083546 B1 | 2/2017 |
| JP | 2018198089 A | 12/2018 |
| JP | 2019057289 A | 4/2019 |
| JP | 2020108074 A | 7/2020 |
| WO | 2016067734 A1 | 5/2016 |

OTHER PUBLICATIONS

International Search Report for related PCT Application No. PCT/JP2021/026977, 4 pages, dated Aug. 31, 2021.
International Search Report for corresponding PCT Application No. PCT/JP2021/026979, 4 pages, dated Oct. 19, 2021.
Extended European Search Report for related EP Application No. 21847182.9, 8 pages, dated Apr. 18, 2024.

* cited by examiner

FIG.8

SCENE IN WHICH USER HAS INTEREST OR STATUS
- ☑ TROPHY WINNING
- ☐ RARE ITEM ACQUISITION
- ☑ BOSS DEFEAT
- ☐ HIGH SCORE ACHIEVEMENT
- ☑ HIGH RANKING WINNING
- ☑ ENDING
- ☐ NUMBER OF TIMES OF DISTRIBUTION
- ☑ NUMBER OF LIKES

[DECIDE]

4

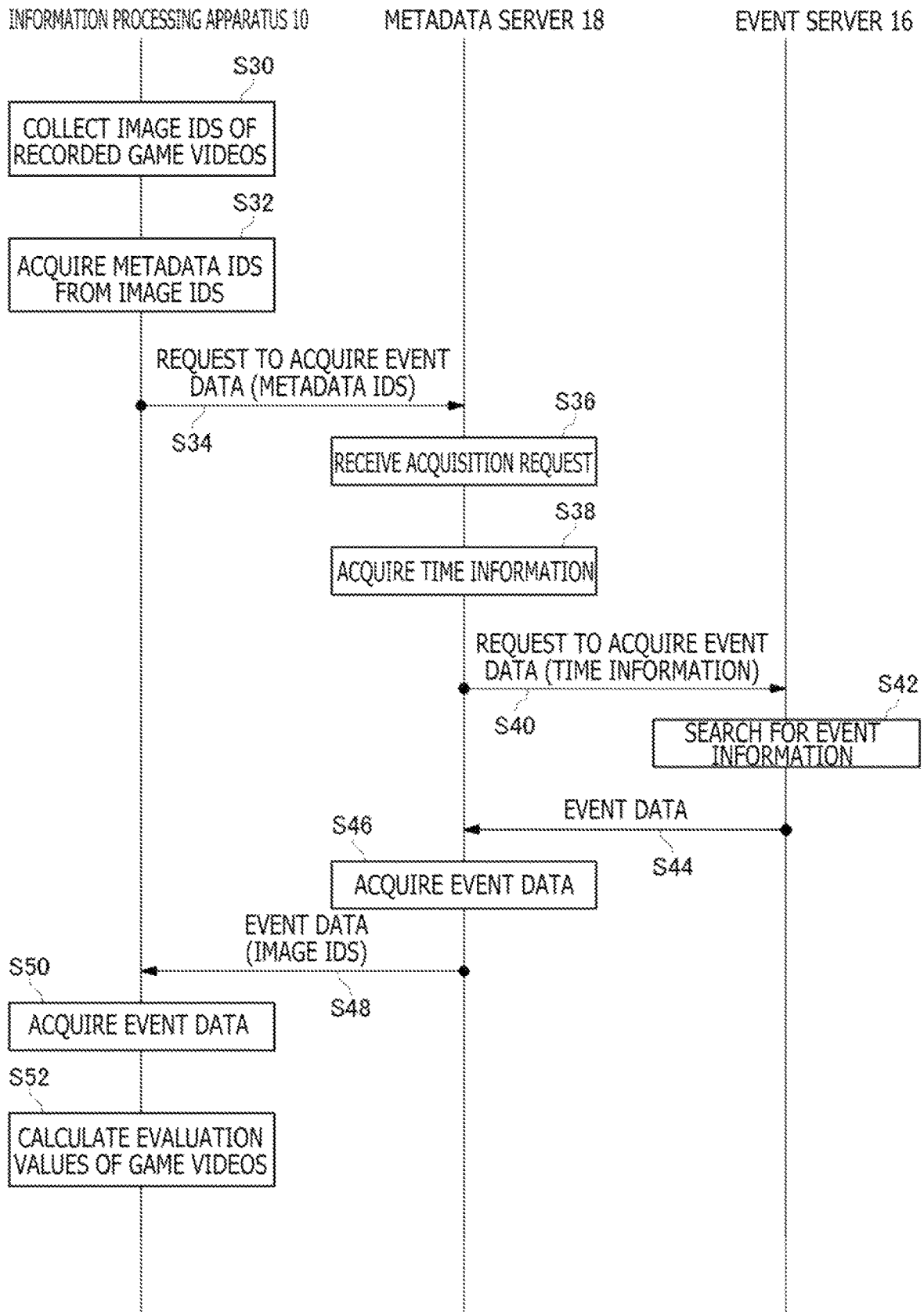

FIG.10

| ITEM | DETAILS | EVALUATION VALUE |
|---|---|---|
| TROPHY WINNING | PLATINUM | 100 |
| | GOLD | 60 |
| | SILVER | 30 |
| | BRONZE | 10 |
| ITEM ACQUISITION | ULTRA-RARE | 80 |
| | SUPER-RARE | 50 |
| | NORMAL-RARE | 10 |
| BOSS DEFEAT | BACKSTAGE BOSS | 90 |
| | FINAL BOSS | 70 |
| | MIDDLE BOSS | 30 |
| | SMALL BOSS | 10 |
| SCORE ACHIEVEMENT | ULTRA-HIGH SCORE | 70 |
| | SUPER-HIGH SCORE | 40 |
| RANKING WINNING | WORLD RANKING TOP 100 | 100 |
| | WORLD RANKING TOP 500 | 70 |
| | WORLD RANKING TOP 1000 | 40 |
| NUMBER OF TIMES OF DISTRIBUTION | MORE THAN 1,000,000 | 80 |
| | MORE THAN 500,000 | 50 |
| | MORE THAN 100,000 | 20 |
| NUMBER OF LIKES | MORE THAN 1,000,000 | 80 |
| | MORE THAN 500,000 | 50 |
| | MORE THAN 100,000 | 20 |
| ENDING SCENE | | 50 |

INFORMATION PROCESSING APPARATUS AND GAME VIDEO RECORDING METHOD

TECHNICAL FIELD

The present invention relates to a technique for recording game videos.

BACKGROUND ART

PTL 1 discloses an information processing apparatus that includes a ring buffer that executes overwriting and records game images and an editing processing section that reads, from the ring buffer, game images recorded during a predetermined time period from a time at which an event has occurred and that extracts the game images as event content data. PTL 2 discloses an electronic apparatus that includes a first acquiring section that acquires a virtual capacity of a save data area from an application, a second acquiring section that acquires a capacity of the save data of the application recorded in a recording apparatus, and a writing control section that prohibits the application from writing the save data in the recording apparatus when the capacity of the save data exceeds the virtual capacity.

CITATION LIST

Patent Literature

[PTL 1] JP 2015-198404A [PTL 2] JP 2013-123537A

SUMMARY

Technical Problems

By recording the game video with which a user played in a built-in or external recording apparatus, the user can enjoy the recorded game video by reproducing it after playing it, and further can upload the video to the distribution server to distribute the video to the viewing users. Therefore, some users record a large number of game videos in a recording apparatus, but the data size of the game video has become much larger than before due to the recent increase in the resolution of game images. Therefore, achievement of a mechanism for efficiently recording game videos is desired.

Therefore, an object of the present disclosure is to achieve a mechanism for effectively recording game videos.

Solution to Problems

In order to solve the above problems, an information processing apparatus according to one aspect of the present disclosure is an information processing apparatus including a recording apparatus that records a plurality of game videos, an image evaluating section that calculates evaluation values of the plurality of game videos recorded in the recording apparatus, and a data reduction processing section that reduces a data amount of a game video recorded in the recording apparatus, on the basis of each of the evaluation values of the plurality of game videos.

Another aspect of the present disclosure is a game video recording method. This method includes a step of calculating evaluation values of a plurality of game videos that have already been recorded in a recording apparatus, a step of reducing a data amount of a game video recorded in the recording apparatus, on the basis of each of the evaluation values of the plurality of game videos, and a step of recording a new game video in the recording apparatus.

It should be noted that any combination of the above-described components and matters obtained by converting expressions of the present disclosure between methods, apparatuses, systems, recording media, computer programs, etc., are also effective as aspects of the present disclosure.

BRIEF DESCRIPTION OF DRAWINGS

FIG. 8 is a diagram illustrating an example of a screen for registering scenes or statuses.

FIG. 9 is a sequence diagram of event data obtaining processing.

FIG. 10 is a diagram illustrating an example of an evaluation value table.

DESCRIPTION OF EMBODIMENT

In an information processing system according to an embodiment, an information processing apparatus executes game software and records, in a recording apparatus, a video (game video) obtained by capturing game images generated by the game software. In the recording apparatus, an upper limit capacity is set for an area for recording game videos (video recording area), and the information processing apparatus records the game videos in the recording apparatus within the upper limit capacity.

Figure 1:
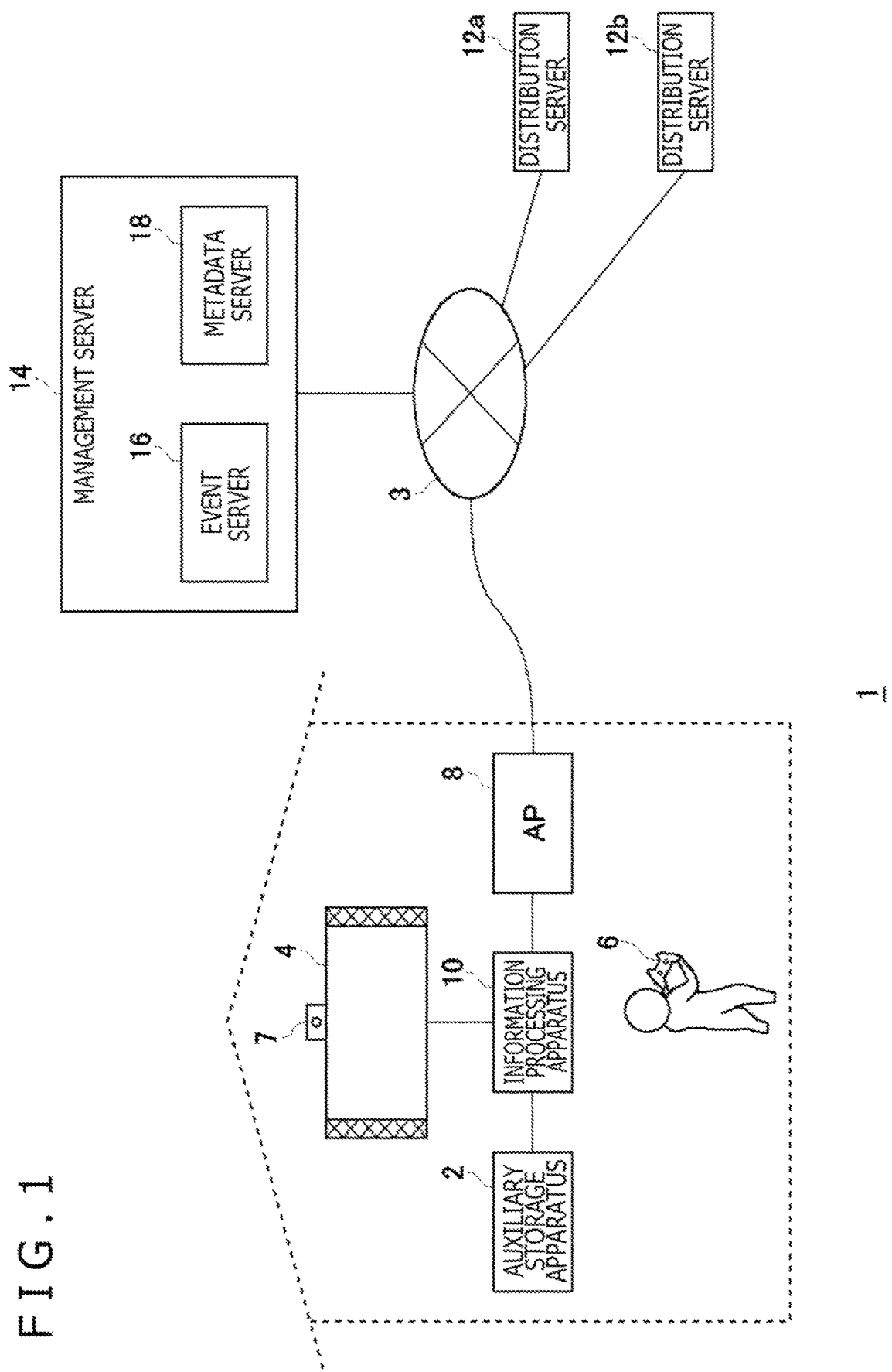
FIG. 1 is a diagram illustrating an information processing system according to an embodiment.

FIG. 1 illustrates an information processing system 1 according to an embodiment of the present disclosure. The information processing system 1 includes an information processing apparatus 10 which is a user terminal apparatus, distribution servers 12a and 12b for distributing content images uploaded by users (hereinafter referred to as a "distribution server 12" unless otherwise especially distinguished), and a management server 14. The management server 14 has an event server 16 and a metadata server 18. The event server 16 and the metadata server 18 may be configured as separate server apparatuses, but may also be achieved as separate functions in one management server 14.

An access point (hereinafter referred to as an "AP") 8 has functions of a wireless access point and a router, and the information processing apparatus 10 is connected to the AP 8 wirelessly or by wire to communicably connected to the distribution servers 12, the event server 16, and the metadata server 18 on a network 3.

The information processing apparatus 10 is connected, wirelessly or by wire, to an input apparatus 6 operated by a user, and the input apparatus 6 outputs, to the information processing apparatus 10, information regarding a user's operation. When receiving the operation information from the input apparatus 6, the information processing apparatus 10 reflects the operation information in the processing of system software and the game software, and causes an output apparatus 4 to output a processing result. In the information processing system 1, the information processing apparatus 10 may be a game apparatus (game console) that executes a game, and the input apparatus 6 may be equipment that supplies user's operation information to the information processing apparatus 10, such as a game controller. Incidentally, the input apparatus 6 may be an input interface such as a keyboard or a mouse.

An auxiliary storage apparatus 2 is a large-capacity recording apparatus such as an HDD (Hard Disk Drive) or an SSD (Solid State Drive), may be a built-in recording apparatus, and also may be an external recording apparatus connected to the information processing apparatus 10 by a USB (Universal Serial Bus), etc. The output apparatus 4 may be a television having a display for outputting images and a speaker for outputting sounds. The output apparatus 4 may be connected to the information processing apparatus 10 with a cable, or may be wirelessly connected to the information processing apparatus 10.

A camera 7 as an image capturing apparatus is provided near the output apparatus 4 and captures an image of a space around the output apparatus 4. Although FIG. 1 illustrates an example in which the camera 7 is attached to the top of the output apparatus 4, the camera 7 may be placed on the side or the bottom of the output apparatus 4 and, in any case, is placed in a position to be capable of capturing the image of the user who is present in front of the output apparatus 4. The camera 7 may be a stereo camera.

The distribution server 12 provides an image sharing service for distributing content images uploaded from the information processing apparatus 10. The distribution server 12 performs on-demand distribution of the accumulated content images in response to requests from viewing users. Although the two distribution servers 12a and 12b are illustrated in FIG. 1, it is sufficient if the number of distribution servers 12 in the information processing system 1 is one or more.

The distribution server 12 manages distribution result data as metadata for each content image to be distributed. The distribution result data includes various kinds of performance data and evaluation data regarding distribution, and may include, for example, the total number of distributions, the number of distributions in the last week, the number of evaluations from viewing users, comments from viewing users, and the like. The distribution server 12 utilizes the distribution result data of each content image to create a popularity ranking of the content image and enhance the attractiveness of the image-sharing site.

When a preset event occurs during the progress of a game, a game program executed by the information processing apparatus 10 outputs an event code indicating the event that has occurred. The information processing apparatus 10 outputs event information including at least an event code and an event occurrence time to the event server 16. The event server 16 receives the event information transmitted from the information processing apparatus 10, associates the event information with a user's account ID (Identification), and accumulates the event information.

In response to a request from the information processing apparatus 10, the metadata server 18 acquires event data of a game video from the event server 16 and acquires distribution result data of the game video from the distribution server 12. The metadata server 18 transmits the acquired event data and distribution result data to the information processing apparatus 10 as metadata of the game video.

Incidentally, for a game video that has not been uploaded to the distribution server 12, the metadata server 18 transmits only event data to the information processing apparatus 10 as metadata of the game video.

Figure 2:
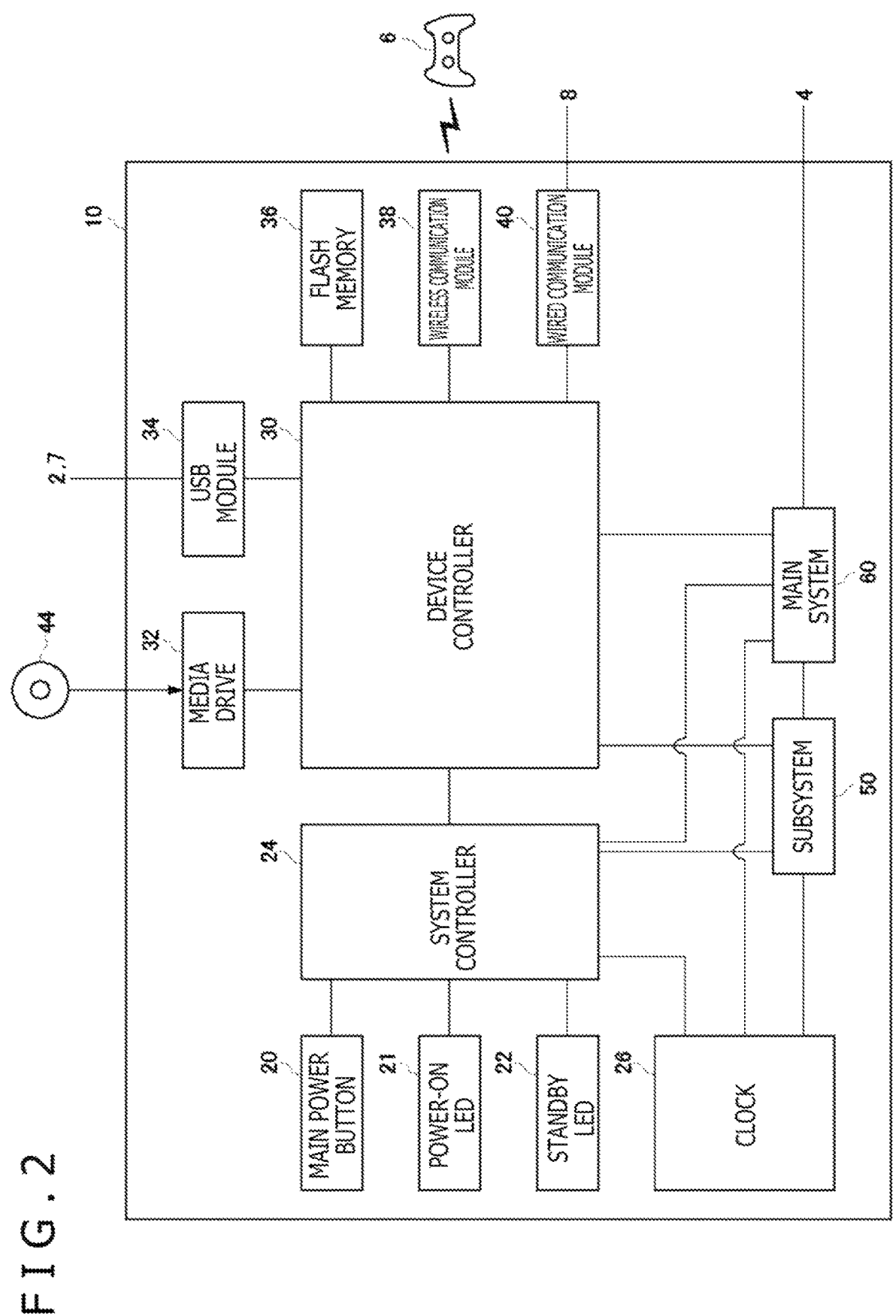
FIG. 2 is a diagram illustrating a hardware configuration of an information processing apparatus.

FIG. 2 illustrates a hardware configuration of the information processing apparatus 10. The information processing apparatus 10 includes a main power button 20, a power-ON LED (Light Emitting Diode) 21, a standby LED 22, a system controller 24, a clock 26, a device controller 30, a media drive 32, a USB module 34, a flash memory 36, a wireless communication module 38, a wired communication module 40, a subsystem 50, and a main system 60.

The main system 60 includes a main CPU (Central Processing Unit), a memory that is a main storage apparatus, a memory controller, a GPU (Graphics Processing Unit), and the like. The GPU is mainly used for arithmetic processing of game programs. The main CPU has a function of activating the system software and executing, under the environment provided by the system software, the game program installed in the auxiliary storage apparatus 2. The subsystem 50 includes a sub-CPU, a memory that is a main storage apparatus, a memory controller, and the like, and does not include a GPU.

While the main CPU has a function of executing game programs installed in the auxiliary storage apparatus 2 or a ROM (Read Only Memory) medium 44, the sub-CPU does not have such a function. However, the sub-CPU has a function of accessing the auxiliary storage apparatus 2 and a function of transmitting/receiving data to/from the management server 14. The sub-CPU is configured to have only such limited processing functions, and therefore can operate with lower power consumption than the main CPU. These functions of the sub-CPU are executed when the main CPU is in the standby state.

The main power button 20 is an input unit for inputting an operation from the user, is provided on the front surface of the housing of the information processing apparatus 10, and is operated to turn on or off the power supply to the main system 60 of the information processing apparatus 10. The power-ON LED 21 lights up when the main power button 20 is turned on, and the standby LED 22 lights up when the main power button 20 is turned off. The system controller 24 detects pressing of the main power button 20 by the user.

The clock 26 is a real-time clock, and generates current date-and-time information, and then supplies the current date-and-time information to the system controller 24, the subsystem 50, and the main system 60.

The device controller 30 is configured as an LSI (Large-Scale Integrated Circuit) that exchanges information between devices, like a south bridge. As illustrated in FIG. 2, devices such as the system controller 24, the media drive 32, the USB module 34, the flash memory 36, the wireless communication module 38, the wired communication module 40, the subsystem 50, and the main system 60 are connected to the device controller 30. The device controller 30 absorbs differences in electrical characteristics and data transfer speeds of the devices, and controls the timing of data transfer.

The media drive 32 is a drive apparatus that is provided with and drives the ROM medium 44 that records application software of games, etc., and license information, and reads programs, data, and the like from the ROM medium 44. The ROM medium 44 is a read-only recording medium such as an optical disk, a magneto-optical disk, or a Blu-ray disk.

The USB module 34 is a module that connects to external equipment with a USB cable. The USB module 34 may be connected to the auxiliary storage apparatus 2 and the camera 7 with USB cables. The flash memory 36 is an auxiliary storage apparatus that constitutes internal storage. The wireless communication module 38 wirelessly communicates with the input apparatus 6, for example, by using a communication protocol such as the Bluetooth (registered trademark) protocol or the IEEE802.11 protocol. The wired communication module 40 performs wired communication with external equipment and connects to the network 3 via the AP 8, for example.

Figure 3:
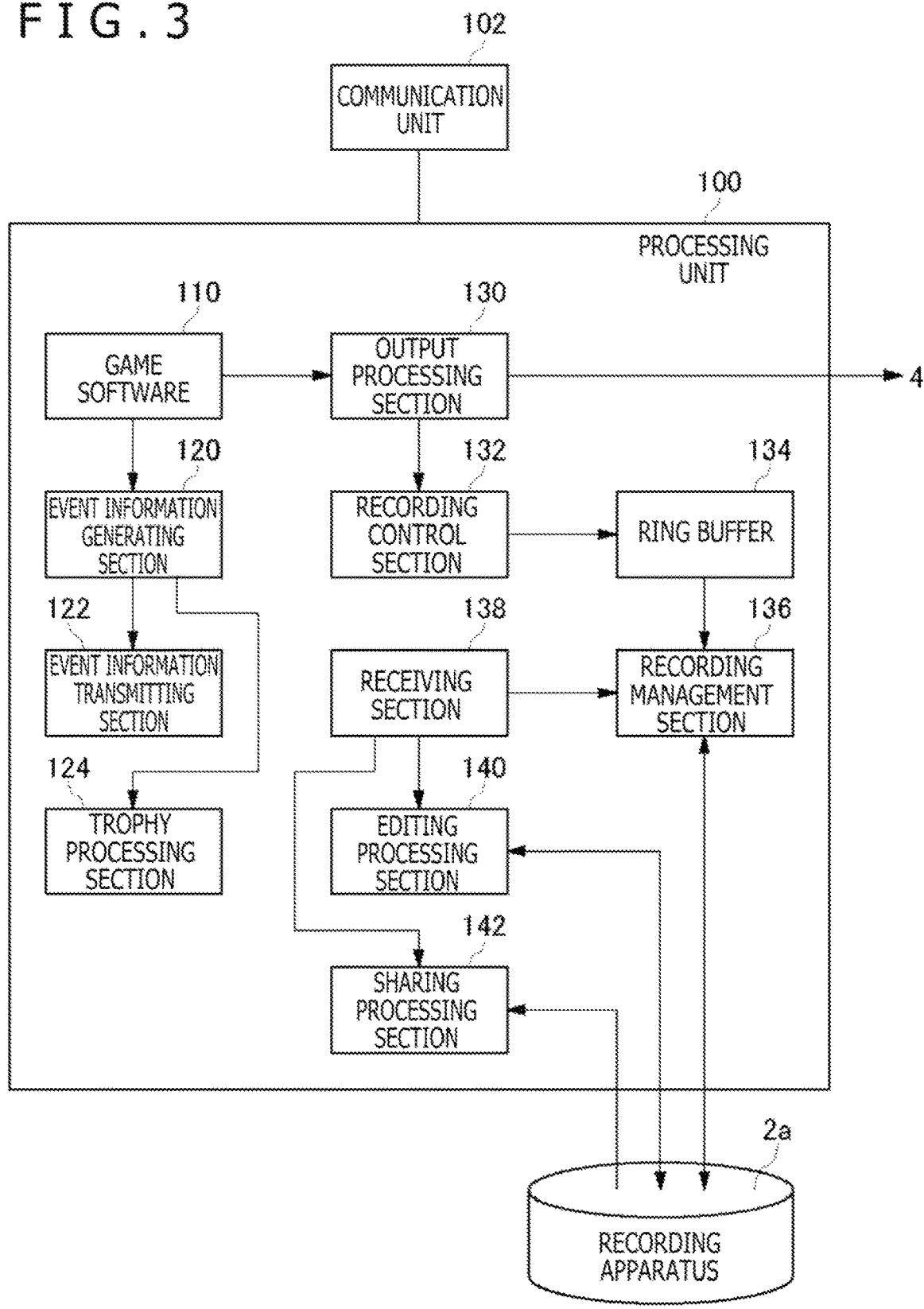
FIG. 3 is a diagram illustrating functional blocks of the information processing apparatus.

FIG. 3 illustrates functional blocks for implementing a game video recording function of the information processing apparatus 10. The information processing apparatus 10 includes a processing unit 100 and a communication unit 102. The processing unit 100 includes a game software 110, an event information generating section 120, an event information transmitting section 122, a trophy processing section 124, an output processing section 130, a recording control section 132, a ring buffer 134, a recording management section 136, a receiving section 138, an editing processing section 140, and a sharing processing section 142. The receiving section 138 receives information regarding an operation on the input apparatus 6 from the user. A recording apparatus 2a may be a part of the recording area of the auxiliary storage apparatus 2, and records captured game videos.

Elements described as functional blocks that perform various processes of the information processing apparatus 10 in FIG. 3 can include circuit blocks, memories, and other LSI circuits in terms of hardware, and are implemented by a program or the like loaded in a memory in terms of software. Therefore, those skilled in the art will understand that these functional blocks can be achieved in various forms by hardware only, software only, or a combination thereof, and are not limited to either one.

The game software 110 includes at least a game program, image data, and sound data. The game program receives information regarding an operation on the input apparatus 6 by the user and performs arithmetic processing to move a player character in a virtual space. The output processing section 130 generates image data and sound data of the game by the game software 110 being executed, and causes the output apparatus 4 to output the data. The output processing section 130 may include a GPU that executes rendering processing and the like.

In the information processing apparatus 10 according to the embodiment, the output processing section 130 generates image data and sound data of the game to cause the output apparatus 4 to output the data, and supplies the data to the recording control section 132 as well. Hereinafter, game image data and sound data will collectively be referred to as a "game video" or "game video data." The information processing apparatus 10 has a function of background-recording of the game video generated by the output processing section 130, and the recording control section 132 temporarily records the game video data in the ring buffer 134.

The ring buffer 134 is configured by a start address and an end address of a recording area of the auxiliary storage apparatus 2 being set. This ring buffer area may be set in advance before shipment of the information processing apparatus 10. The recording control section 132 temporarily records the game video data output from the output processing section 130 in the ring buffer 134 together with time information (time stamp).

The recording control section 132 records the game video data in the ring buffer 134 in predetermined order of addresses from the start address and, when having recorded up to the end address, returns to the start address to execute overwriting and recording, and repeats this operation. For example, the ring buffer 134 is set to record 60 minutes of game video, and the recorded game video is time-stamped. By performing background-recording on the game video in the ring buffer 134, the user can cut out and edit a favorite scene from the play video recorded up to 60 minutes before, and save the edited scene in the recording apparatus 2a. The user may upload the saved game video to the distribution server 12.

When a preset event occurs during the progress of the game, the game program outputs an event code indicating the event that has occurred. The event information generating section 120 acquires an event code from the game software 110 and generates event information in which time information (time stamp) indicating the time at which the event has occurred is added to the event code.

A game developer may arrange various events in the game. An event code is allocated to each event, and the game program may add game data indicating the state of the game at the time of the event occurrence to the event code indicating the event that has occurred, and output the event code. Here, the game data includes peripheral information such as information regarding the place where the event occurs, opponents, objects, and the like. For example, when a battle with an enemy boss starts, the game program may add game data indicating the location of the battle and the character ID of the enemy boss to the event code indicating the start of the battle, and output the event code.

When acquiring the event code and the game data, the event information generating section 120 adds thereto time information indicating the time at which the event has occurred, and generates event information. The event information generating section 120 supplies the generated event information to the event information transmitting section 122 and the trophy processing section 124.

When the user defeats the enemy boss, the game program outputs an event code indicating that the enemy boss has been defeated. At this time, the game program adds game data indicating the battle location and a character ID of the enemy boss to the event code and outputs the event code. The event information generating section 120 generates event information by adding time information indicating the time of the event occurrence to the event code and game data.

When the user acquires a game item, the game program outputs an event code indicating that the item has been acquired. At this time, the game program adds game data indicating the place of acquisition to the event code and outputs the event code. The event information generating section 120 generates event information by adding time information indicating the time of the event occurrence to the event code and game data. As described above, the game developer may define various events and incorporate the events into the game.

In addition, various missions are set in the game for the purpose of increasing the user's motivation to play the game, and when the user clears the mission, the user may be given a virtual award (trophy) corresponding to the mission. A plurality of trophies are prepared in the game according to the difficulty of the mission, and trophies of bronze, silver, gold, and platinum may be prepared in ascending order of difficulty.

The conditions for unlocking trophies (i.e., the conditions under which a user earns trophies by completing missions) may be associated with specific events. For example, in a case where a mission of "defeating a small boss" for a bronze trophy is set, the player is awarded a bronze trophy when the player defeats the small boss. Also, in a case where a mission of "defeating a middle boss" for a silver trophy is set, the silver trophy will be awarded when the player defeats the middle boss, and in a case where a mission of "defeating a final boss" for a gold trophy is set, the gold trophy will be awarded when the player defeats the final boss. Further, in a case where a mission of defeating a "backstage boss" for a platinum trophy is set, the player may be awarded a platinum trophy by defeating the backstage boss.

The trophy processing section 124 holds a correspondence relation between event codes and trophy unlock conditions. When event information is provided from the event information generating section 120, the trophy processing section 124 refers to the correspondence relation and performs processing for determining whether the trophy unlock condition is satisfied, on the basis of the event information. When determining that the unlocking condition is satisfied, the trophy processing section 124 records the unlocked trophy information together with the time information (time stamp) in the recording apparatus 2a. The unlocked trophy information may be sent to the management server 14.

The event information transmitting section 122 transmits the event information supplied from the event information generating section 120, from the communication unit 102 to the event server 16. Therefore, the event server 16 collects all event information regarding events that have occurred during the game play. The event information transmitting section 122 may transmit the event information each time the event information is supplied, or may collectively and periodically transmit the event information.

During execution of the game, the receiving section 138 receives an instruction regarding recording from the user. When the user operates a predetermined button on the input apparatus 6, the receiving section 138 receives the operation as an instruction for recording, and the recording management section 136 saves, in the recording apparatus 2a, the game video (video clip) having a length of up to 60 minutes recorded in the ring buffer 134. The duration of the video clip to be recorded may be preset by the user, with the upper limit being 60 minutes.

In the recording apparatus 2a, an upper limit capacity is set for an area for recording captured game videos (hereinafter also referred to as a "video recording area"). The upper limit capacity may be freely set by the user, for example, within a range of 1 to 50 GB. In a case where the upper limit capacity is set to 50 GB, the recording management section 136 manages the data size of game videos in such a manner that the total amount of data of all game videos to be recorded in the recording apparatus 2a is 50 GB or less.

When saving, in the recording apparatus 2a, the game video temporarily recorded in the ring buffer 134, the recording management section 136 compares the data amount of the game video with the amount of space of the video recording area, and saves the game video in free space when the free space is larger than the data amount. Here, the free space is a capacity obtained by subtracting the total data amount of all recorded game videos from the upper limit capacity. On the other hand, in a case where the data amount of the game video is larger than the free space, the recording management section 136 performs processing to reduce the data amount of the recorded game videos to expand the free space, and then saves the captured game video. The process of reducing the data amount of game videos includes deleting all or part of a game video. The data reduction processing will be described later.

Note that, during the game play, the user operates the input apparatus 6 to set the start point of the game video to be saved, and after the desired game scene ends, the user operates the input apparatus 6 to set the end point of the saving, so that the recording management section 136 may save, in the recording apparatus 2a, the game video specified by the start point and the end point. The recording management section 136 sets an image ID for identifying the game video, when saving the game video in the recording apparatus 2a. An image ID for uniquely identifying the video is always set to the game video saved in the recording apparatus 2a. In addition, the recording management section 136 sets time information indicating the start time and the end time of the game video as metadata of the game video and records the time information in the recording apparatus 2a. Therefore, in the recording apparatus 2a, the game video is saved in association with the image ID, the start time, and the end time.

After finishing the game, the user can edit the game video recorded in the recording apparatus 2a. For example, the user may operate the input apparatus 6 to set the start point and the end point of a scene that the user wants to save from the 60-minute game video recorded in the recording apparatus 2a.

Figure 4:
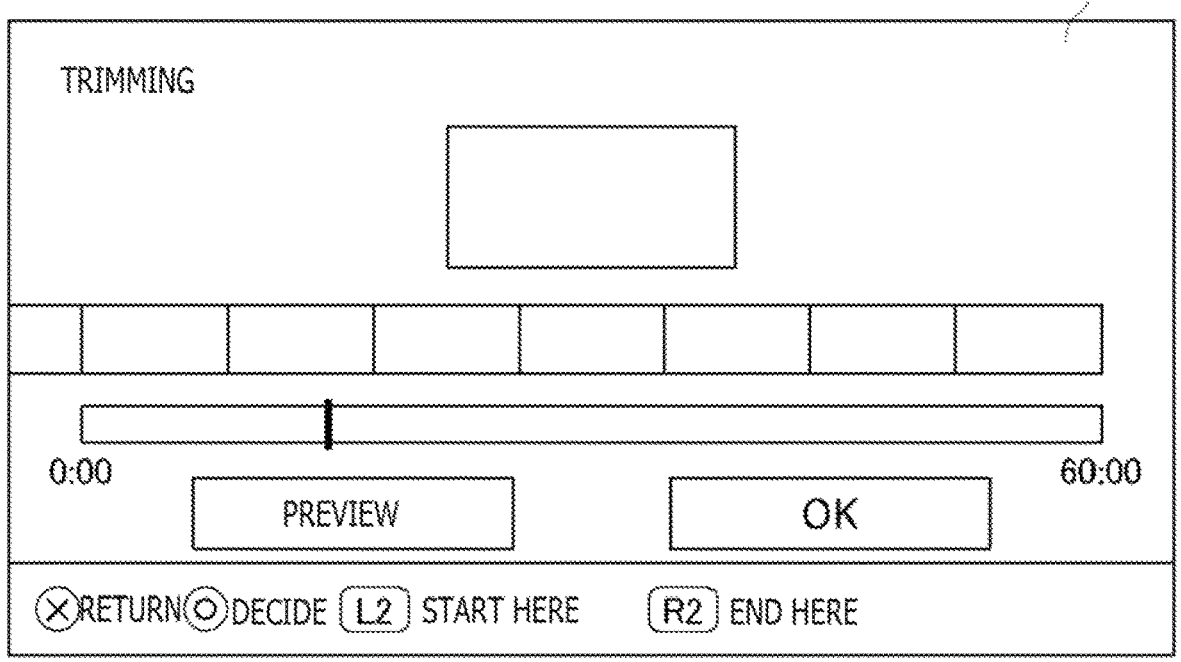
FIG. 4 is a diagram illustrating a trimming edit screen.

FIG. 4 illustrates a trimming edit screen 200. On the trimming edit screen 200, the user can edit the game video saved in the recording apparatus 2a. For example, in a case where a maximum time period for videos that can be uploaded to the distribution server 12 is set, the user may operate the input apparatus 6 to specify the start point and the end point for trimming the game video, and cut the video into a piece which can be uploaded. When the receiving section 138 accepts designation of the start point and the end point from the user, the editing processing section 140 cuts out the game video recorded in the recording apparatus 2a, at the time positions of the start point and the end point, executes overwriting, and saves the video in the recording apparatus 2a. At this time, the image ID is not changed. Incidentally, regardless of uploading, the user may edit the game video to cut out a favorite play scene.

In the information processing system 1, the user can share the game video recorded in the recording apparatus 2a with other users. To be specific, when the user selects the game video to be uploaded from the recording apparatus 2a and further selects the distribution server 12 as the upload destination, the receiving section 138 receives the selecting operation for the game video and the distribution server 12, and the sharing processing section 142 uploads the game video to the selected distribution server 12. When starting distribution of the game video, the distribution server 12 manages the distribution result of the game video and accumulates the distribution result data. The distribution result data includes various kinds of performance data and evaluation data regarding distribution, and may include, for example, the total number of distributions and the number of evaluations from viewing users.

Figure 5:
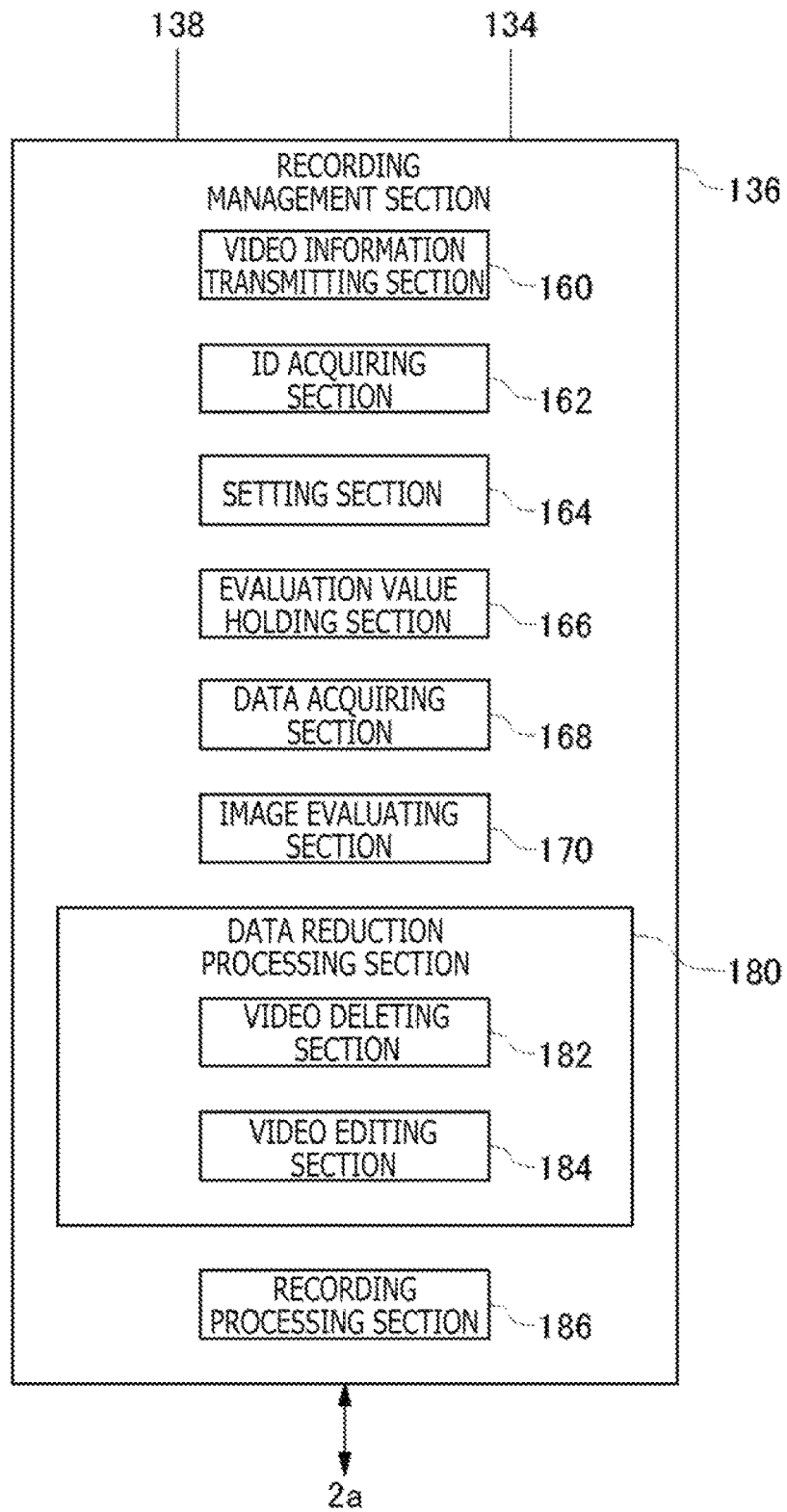
FIG. 5 is a diagram illustrating functional blocks of a recording management section.

FIG. 5 illustrates detailed functional blocks of the recording management section 136. The recording management section 136 manages the process of recording game videos in the video recording area, and specifically performs data reduction processing of reducing the amount of data of the game videos in order to keep the total amount of data of a plurality of game videos to be recorded within the upper limit capacity of the video recording area. The recording management section 136 includes a video information transmitting section 160, an ID acquiring section 162, a setting section 164, an evaluation value holding section 166, a data acquiring section 168, an image evaluating section 170, a data reduction processing section 180, and a recording processing section 186. The data reduction processing section 180 has a video deleting section 182 and a video editing section 184.

The recording management section 136 performs data reduction processing on the game video on the basis of the metadata of the game video. Hereinafter, processing that is a prerequisite for obtaining event data will be described with reference to FIG. 6, and processing for obtaining event data will be described with reference to FIG. 9. Incidentally, the event data constitutes metadata of the game video.

Figure 6:
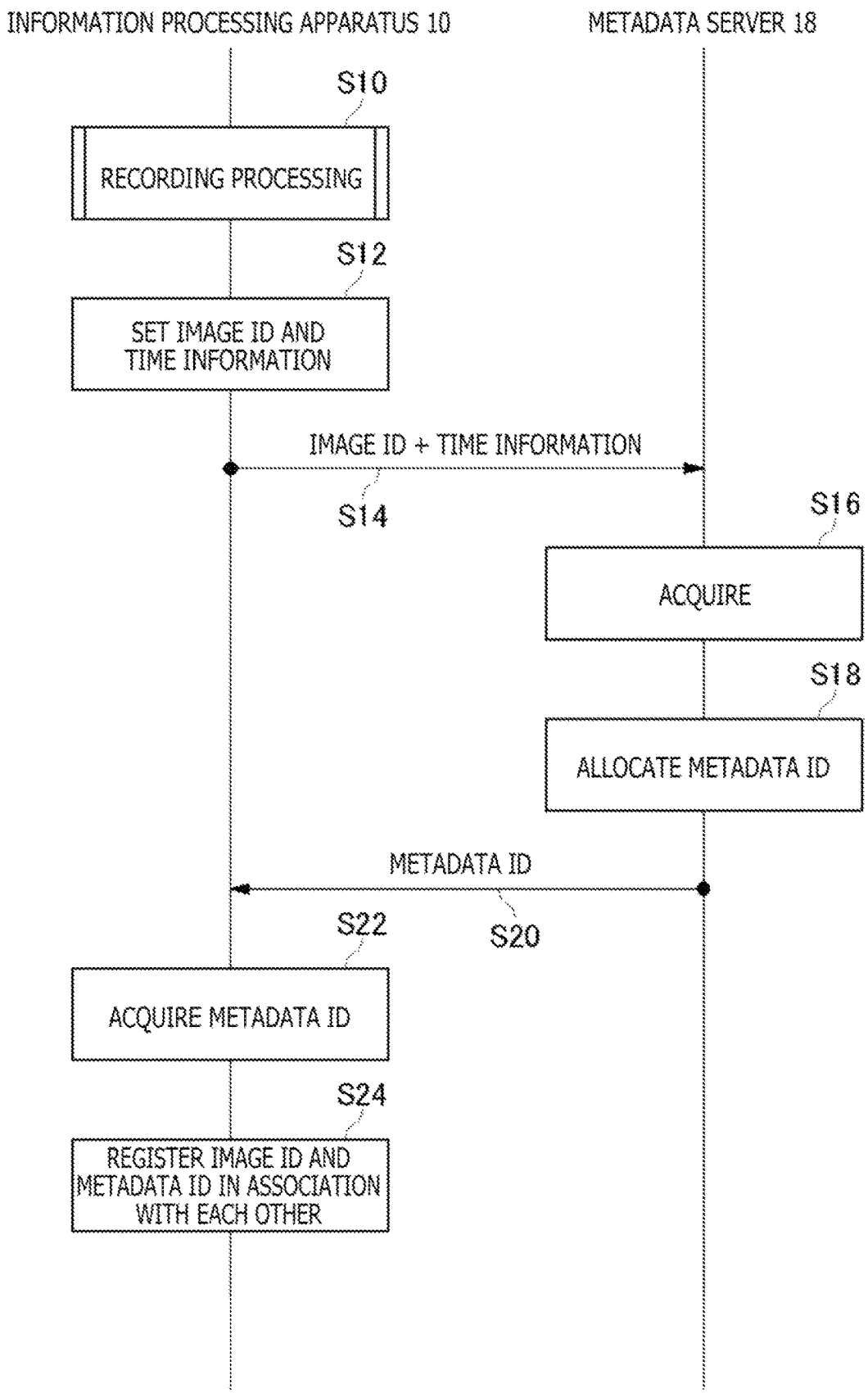
FIG. 6 is a sequence diagram of processing for transmitting game video information.

FIG. 6 is a sequence diagram of processing for transmitting game video information to the metadata server 18. When the receiving section 138 receives a request from the user to record the game video (video clip) that is temporarily recorded in the ring buffer 134, the recording management section 136 performs recording processing of the game video on the basis of the free space of the video recording area (S10). Details of the recording processing will be described later with reference to FIG. 11.

In the recording management section 136, the recording processing section 186 saves, in the recording apparatus 2a, the game video (video clip) temporarily recorded in the ring buffer 134. When saving the game video in the recording apparatus 2a, the recording processing section 186 sets an image ID for identifying the game video and time information indicating the start time and the end time of the game video (S12). The start time and the end time may be time stamps generated as absolute time such as UTC (Coordinated Universal Time) or GMT (Greenwich Mean Time). When the game video is saved in the recording apparatus 2a, the video information transmitting section 160 transmits, to the metadata server 18, the image ID set for the game video in the recording apparatus 2a and the time information indicating the start time and the end time of the game video (S14).

Figure 7:
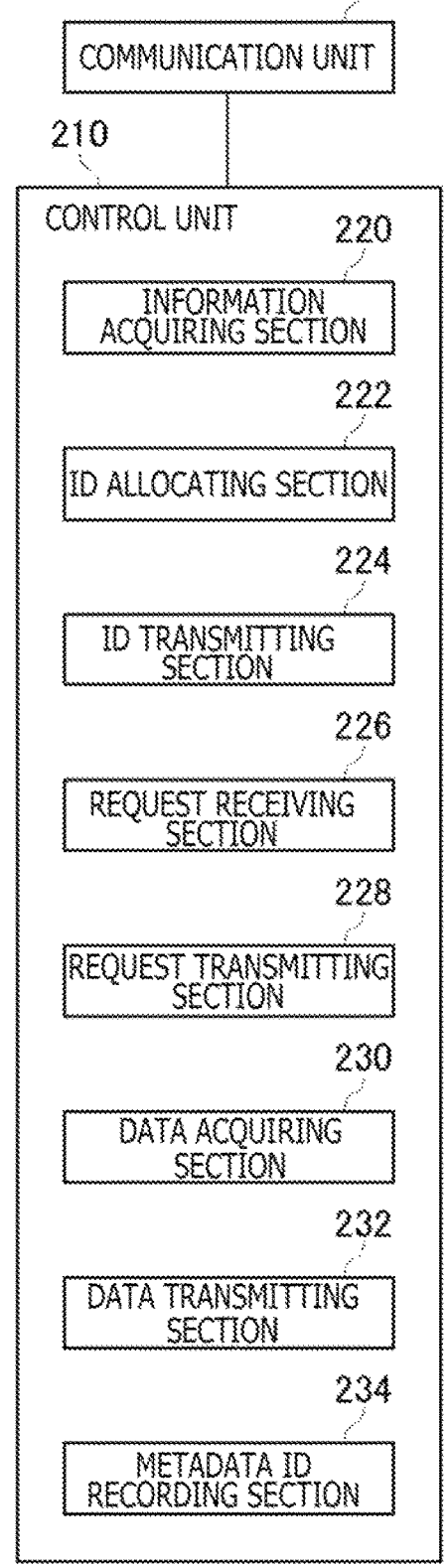
FIG. 7 is a diagram illustrating functional blocks of a metadata server.

FIG. 7 illustrates functional blocks of the metadata server 18. The metadata server 18 has a control unit 210 and a communication unit 212. The control unit 210 has an information acquiring section 220, an ID allocating section 222, an ID transmitting section 224, a request receiving section 226, a request transmitting section 228, a data acquiring section 230, a data transmitting section 232, and a metadata ID recording section 234.

The elements described as the functional blocks for performing various processes of the metadata server 18 in FIG. 7 can include circuit blocks, memories, and other LSI circuits in terms of hardware, and the elements are achieved by a program or the like loaded into a memory in terms of software. Therefore, those skilled in the art will understand that these functional blocks can be achieved in various forms by hardware only, software only, or a combination thereof, and are not limited to either one.

In the metadata server 18, the information acquiring section 220 acquires, from the information processing apparatus 10, the image ID of the game video recorded in the information processing apparatus 10 and the time information indicating the start time and the end time of the game video (S16). The ID allocating section 222 allocates a metadata ID to a combination of the image ID and the time information, and records metadata ID in the metadata ID recording section 234 (S18). The ID transmitting section 224 transmits the allocated metadata ID to the information processing apparatus 10 (S20).

In the information processing apparatus 10, when obtaining the metadata ID from the metadata server 18 (S22), the ID acquiring section 162 records the image ID transmitted to the metadata server 18 and the metadata ID transmitted from the metadata server 18 in the recording apparatus 2a in association with each other (S24). By registering the metadata ID in the recording apparatus 2a in the above procedure, event data can be acquired from the metadata server 18 as described later.

Note that the user can manually edit the game video saved in the recording apparatus 2a. When the start point and/or the end point of the game video is changed by the user's editing operation, the editing processing section 140 executes overwriting, saves the edited game video in the recording apparatus 2a (S10), and updates the time information indicating the start time and/or the end time according to the changed game video (S12). At this time, the video information transmitting section 160 transmits the image ID and the updated time information to the metadata server 18 (S14), and the metadata server 18 updates the time information associated with the image ID (S16). In the metadata ID recording section 234, the metadata ID is not changed for the updated combination of the image ID and the time information.

The process of transmitting the game video metadata (the image ID and the video time information) may be performed each time the game video is saved in the recording apparatus 2a, or may be performed periodically. For example, at a predetermined time of a day, unsent game video metadata may be collectively sent to the metadata server 18.

In the information processing apparatus 10, captured game videos are recorded in a video recording area having a predetermined upper limit capacity. Therefore, at the time of attempting to record a newly captured game video, if the capacity of free area (free space) in the video recording area is smaller than the amount of data of the game video, the recording management section 136 reduces the data amount of the game video that has already been recorded, to increase the free space in the video recording area. At this time, it is preferable to perform the data reduction process by selecting game videos that are unlikely to interest the user, instead of randomly selecting game videos whose amount of data is to be reduced.

FIG. 8 illustrates an example of a screen for registering scenes in which the user is interested or statuses. When the user selects an item indicating a scene or a status on this screen, the setting section 164 registers the item selected by the user in the recording apparatus 2a. The items selected by the user are referred to in data reduction processing executed by the data reduction processing section 180. Here, "TROPHY WINNING," "BOSS DEFEAT," "HIGH RANKING WINNING," "ENDING," and "NUMBER OF LIKES" are selected, and when there is a selected item in the metadata of the game video provided from the management server 14, the evaluation value of the game video is calculated to be higher.

FIG. 9 is a sequence diagram of event data obtaining processing on a game video. The data acquiring section 168 identifies the image IDs of all game videos recorded in the recording apparatus 2a (S30), and acquires the metadata IDs associated with the identified image IDs from the recording apparatus 2a (S32). The data acquiring section 168 transmits, to the metadata server 18, a request to acquire event data, the request including the plurality of acquired metadata IDs (S34). Incidentally, the acquisition request includes the user's account ID.

In the metadata server 18, a request receiving section 226 receives the event data acquisition request including the metadata IDs from the information processing apparatus 10 (S36). Metadata IDs allocated to image IDs and time information are recorded in the metadata ID recording section 234. The request transmitting section 228 acquires the time information from the metadata ID recording section 234 on the basis of the metadata IDs included in the acquisition request (S38). To be specific, the request transmitting section 228 searches the metadata ID recording section 234 for the metadata IDs included in the acquisition request, and extracts the time information associated with the metadata IDs from the metadata ID recording section 234. As described above, the time information includes the start time and the end time of the game video. The request transmitting section 228 transmits a request to acquire event data, the request including time information, to the event server 16 (S40). The acquisition request includes the user's account ID.

When acquiring the event data acquisition request, the event server 16 searches for event information within the time range determined by the time information included in the acquisition request, among pieces of the event information accumulated in association with the user's account ID (S42). For example, in a case where one piece of time information included in the acquisition request indicates that the start time is 20:30:00 and the end time is 20:35:45 on Jun. 30, 2020, the event server 16 searches for event information that includes time information (time stamp) within the range of 20:30:00 to 20:35:45 on Jun. 30, 2020 among pieces of event information accumulated in association with the account ID. If the acquisition request contains a plurality of pieces of time information, the event server 16 retrieves event information for each piece of time information.

The event server 16 extracts event information having a time stamp within the time range defined by the time information (the start time and the end time of the game video) included in the acquisition request, and transmits the event data to the metadata server 18 (S44). Here, the event data may be the same as the extracted event information, but may be data in which part or all of the game data included in the event information is omitted, for example.

In the metadata server 18, the data acquiring section 230 acquires the event data transmitted from the event server 16 (S46), and the data transmitting section 232 transmits the event data to the information processing apparatus 10 in association with the image IDs (S48).

In the information processing apparatus 10, the data acquiring section 168 acquires event data associated with the image IDs (S50). At this time, the data acquiring section 168 acquires event data associated with each of the plurality of image IDs, and supplies the acquired event data to the image evaluating section 170. The image evaluating section 170 calculates evaluation values of a plurality of game videos recorded in the video recording area (S52).

Incidentally, among the game videos recorded in the recording apparatus 2a, the sharing processing section 152 may acquire, from the distribution server 12, distribution result data of a game video that has been uploaded to the distribution server 12, to supply the distribution result data to the image evaluating section 170. The distribution result data may include the total number of distributions, the number of distributions in the last week, the number of "likes" by viewing users, and the like. The image evaluating section 170 may calculate an evaluation value of the distributed game video, by using the distribution result data of the game video.

FIG. 10 illustrates an example of an evaluation value table held by the evaluation value holding section 166. The evaluation value table includes evaluation values allocated to items such as events and distribution results. The image evaluating section 170 calculates the evaluation values of the game videos on the basis of the event data and/or the distribution result data of the game videos by referring to the evaluation value table. It means that a game video with a high evaluation value is likely to interest the user and, on the other hand, a game video with a low evaluation value is unlikely to interest the user.

For example, it is assumed that the following boss defeating event has occurred in one game video, resulting in trophy acquisition, and the following distribution result data has been associated with the game video.
Event
Defeat the final boss
Trophy
Win a gold trophy
Number of times of distribution
150,000 times At this time, as illustrated in FIG. 8, it is assumed that the user selects "TROPHY WINNING," "BOSS DEFEAT," "HIGH RANKING WINNING," "ENDING," and "NUMBER OF LIKES" as items in which the user is interested. The image evaluating section 170 performs a process of adding 20 points of evaluation values to the selected item.

With Reference to FIG. 10, evaluation values for each element of the game video are as follows.
Defeat the final boss
70 points+20 points (additional points)
Win a gold trophy
60 points+20 points (additional points)
150,000 times of distribution
20 points
As described above, the image evaluating section 170 calculates the total evaluation value of the game video, and the value is 190 points in this example.

The image evaluating section 170 calculates evaluation values for all game videos recorded in the recording apparatus 2a. The timing for calculating the evaluation value may be the timing at which the data reduction processing by the data reduction processing section 180 is required. That is, at the timing at which the recording processing section 186 attempts to record a new game video in the video recording area and finds that the free space in the video recording area is insufficient, the image evaluating section 170 may calculate evaluation values of all the recorded game videos.

Figure 11:
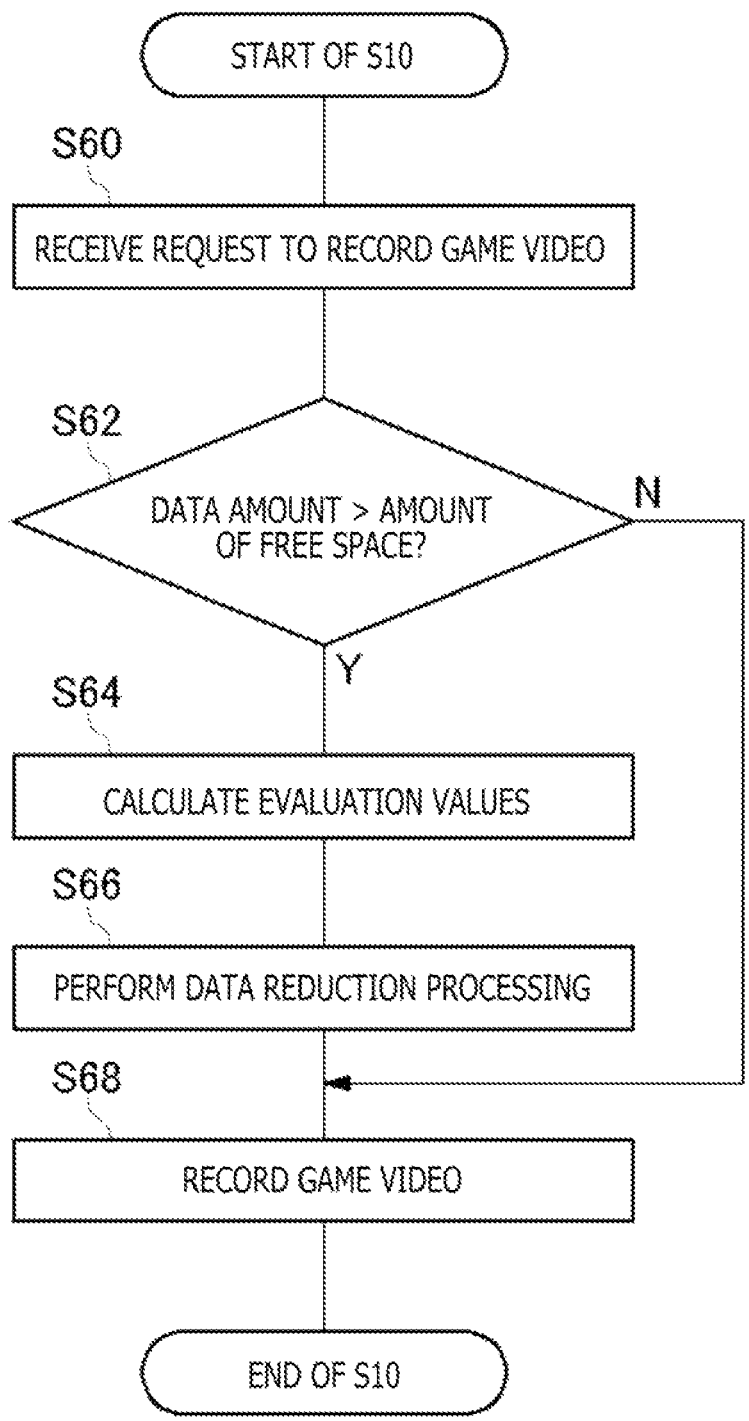
FIG. 11 is a diagram illustrating an example of a detailed flow of recording processing.

FIG. 11 illustrates an example of a detailed flow of the recording processing of S10 illustrated in FIG. 6. When the receiving section 138 receives a request to record a game video from the user (S60), the recording processing section 186 compares the data amount of the game video to be subsequently recorded with the amount of free space of the video recording area (S62). Here, it is assumed that the upper limit capacity of the video recording area is 50 GB, the total data amount of the recorded game videos is 49.5 GB, and therefore the amount of free space is 0.5 GB. In a case where the data amount of the game video to be subsequently recorded is equal to or less than the amount of free space (0.5 GB) (N of S62), the recording processing section 186 records the game video in the free space (S68). At this time, the data reduction processing section 180 does not perform data reduction processing.

On the other hand, in a case where the data amount of the game video to be subsequently recorded is larger than the amount of free space (0.5 GB) (Y of S62), the game video cannot be recorded in the free area of the video recording area. Therefore, it is necessary to perform data reduction processing to increase the free space in the video recording area. For example, in a case where the data amount of the game video is 1.2 GB, the free area of the video recording area needs to be expanded by at least 0.7 (=1.2−0.5) GB. Hereinafter, the required expansion capacity of the free space is simply referred to as an "expansion capacity." In the embodiment, the image evaluating section 170 calculates evaluation values for all game videos recorded in the video recording area, in order to generate an index for determining game videos whose data amount is to be reduced (S64).

The data reduction processing section 180 reduces the data amount of the game video recorded in the video recording area, on the basis of each of evaluation values of the plurality of game videos (S66). In this example, the data reduction processing section 180 reduces the data amount of the game video by at least the expansion capacity (0.7 GB). Several modes of the data reduction processing are illustrated below.

(1) Mode of Data Reduction Processing by the Video Deleting Section 182

The video deleting section 182 deletes game videos with relatively low evaluation values from the video recording area. A relatively low evaluation value means at least that the evaluation value is lower than the average value of the evaluation values of all game videos. For example, the video deleting section 182 may determine game videos to be deleted in ascending order of evaluation value of the game video until the total data amount reaches or exceeds the expansion capacity. Deletion of a game video here means deletion of the whole game video. The video deleting section 182 may add the data amounts of the game videos in ascending order of the evaluation value, and set one or more game videos the added data amount of which becomes equal to or greater than the expansion capacity as game videos to be deleted.

For example, a case where there are a video A, a video B, a video C, and a video D in order of increasing evaluation value and where the video A has a data amount of 0.4 GB, the video B has 0.2 GB, the video C has 0.3 GB, and the video D has 0.1 GB will be described. When the data amounts of the game videos are added in ascending order of the evaluation value, at the time at which the data amounts of the video A, the video B, and the video C have been added, the added value becomes 0.9 GB, which exceeds the expansion capacity. Therefore, the video deleting section 182 may set the video A, the video B, and the video C as videos to be deleted and delete these videos.

Note that the video deleting section 182 may set a condition that the evaluation value of the game video is equal to or less than a predetermined threshold as a condition for further deletion. For example, a game video with an evaluation value of 30 points or less is assumed to have few exciting scenes and not to attract the user's interest. Therefore, the video deleting section 182 may determine a game video having an evaluation value that is relatively low and equal to or less than a predetermined threshold (for example, 30 points) as a target to be deleted and delete this video. At this time, the video deleting section 182 may delete a game video whose data amount greatly exceeds the expansion capacity.

(2) Mode of Data Reduction by the Video Editing Section 184

The video editing section 184 reduces the data amount of a game video with a relatively low evaluation value by deleting part of the game video. For example, in a case where one event is included in a 15-minute game video, it is assumed that the scenes before and after the occurrence of the event (event scenes) are attractive but other scenes lack excitement. Therefore, the video editing section 184 may edit the game video to delete scenes other than event scenes of the game video in ascending order of the evaluation value until the total amount of data reduced by the editing becomes greater than or equal to the expansion capacity.

In the above description, the video editing section 184 regards a game video with a relatively low evaluation value as the editing target, but the editing target may be determined based on another criterion. For example, the video editing section 184 may determine, as the editing target, a game video whose evaluation value is lower than a predetermined threshold and whose data amount is greater than a predetermined threshold. A game video whose evaluation value is lower than a predetermined threshold and whose data amount is larger than a predetermined threshold can be said to be a video that lacks scenes effectively attracting the user's interest. Therefore, it is considered that the video editing section 184 can efficiently reduce the amount of data of such a game video by setting the game video as the editing target.

It should be noted that, in the above-described data reduction modes by the video deleting section 182 and the video editing section 184, the evaluation value calculated by the image evaluating section 170 is used, but the game video reproducing time period varies. Therefore, an evaluation value converted into an evaluation value per unit time may be used. The video deleting section 182 and the video editing section 184 can normalize the evaluation of the game video by using the evaluation value per unit time. Incidentally, owing to editing by the video editing section 184, deleting a part of the game video shortens the video time period, so that the evaluation value per unit time increases.

The recording processing section 186 records a new game video in the video recording area that has been subjected to the data reduction processing (S68). As described above, the recording management section 136 can effectively reduce the data amount of the game video and record a new game video by using the evaluation value of each game video.

The present disclosure has been described above based on the embodiment. It should be understood by those skilled in the art that this embodiment is an example, that various modifications can be made to combinations of the components and the handling processes, and that such modifications are also within the scope of the present disclosure.

INDUSTRIAL APPLICABILITY

The present disclosure can be used in the technique of recording game videos.

REFERENCE SIGNS LIST

1: Information processing system
10: Information processing apparatus
14: Management server
16: Event server 18: Metadata server
100: Processing unit
102: Communication unit
110: Game software
120: Event information generating section
122: Event information transmitting section
124: Trophy processing section
130: Output processing section
132: Recording control section
134: Ring buffer
136: Recording management section
138: Receiving section
140: Editing processing section
142: Sharing processing section
160: Video information transmitting section
162: ID acquiring section
164: Setting section
166: Evaluation value holding section
168: Data acquiring section
170: Image evaluating section
180: Data reduction processing section
182: Video deleting section
184: Video editing section
186: Recording processing section
200: Trimming edit screen
210: Control unit
212: Communication unit
220: Information acquiring section
222: ID allocating section
224: ID transmitting section
226: Request receiving section
228: Request transmitting section
230: Data acquiring section
232: Data transmitting section
234: Metadata ID recording section

The invention claimed is:

1. An information processing apparatus comprising:
a recording apparatus that records a plurality of game videos;
an image evaluating section that calculates evaluation values of the plurality of game videos recorded in the recording apparatus; and
a data reduction processing section that reduces a data amount of a game video recorded in the recording apparatus, on a basis of each of the evaluation values of the plurality of game videos.

2. The information processing apparatus according to claim 1, wherein the data reduction processing section deletes a game video with a relatively low evaluation value from the recording apparatus.

3. The information processing apparatus according to claim 1, wherein the data reduction processing section reduces a data amount of a game video by deleting a part of the game video.

4. The information processing apparatus according to claim 1, wherein the data reduction processing section reduces a data amount of a game video with a relatively low evaluation value per unit time.

5. The information processing apparatus according to claim 1, wherein
an upper limit capacity is set for an area that records a plurality of game videos in the recording apparatus, and
the data reduction processing section reduces the data amount of the game video that has already been recorded, when a new game video is recorded in the recording apparatus.

6. The information processing apparatus according to claim 1, wherein
the information processing apparatus executes game software, the game software outputs,
when a preset event occurs while a game is in progress, an event code indicating the event, and the information processing apparatus is connected with a management server and further includes
an event information transmitting section that transmits, to the management server, event information including the event code and a time at which the event has occurred,
a video information transmitting section that transmits, to the management server, an image identification set for the game video in the recording apparatus and time information indicating a start time and an end time of the game video, and
an event data acquiring section that acquires, from the management server, event data identifying the event that has occurred in the game video, and
the image evaluating section uses the acquired event data to calculate the evaluation values of the plurality of game videos.

7. A method for recording a game video, the method comprising:
calculating evaluation values of a plurality of game videos that have already been recorded in a recording apparatus;
reducing a data amount of a game video recorded in the recording apparatus, on a basis of each of the evaluation values of the plurality of game videos; and
recording a new game video in the recording apparatus.

8. A non-transitory, computer readable storage medium containing a computer program, which when executed by a computer, causes the computer to perform method for recording a game video by carrying out actions, comprising:
calculating evaluation values of a plurality of game videos that have already been recorded in a recording apparatus;
reducing a data amount of a game video recorded in the recording apparatus, on a basis of each of the evaluation values of the plurality of game videos; and
recording a new game video in the recording apparatus.

* * * * *